(12) United States Patent
Yu

(10) Patent No.: US 11,760,137 B2
(45) Date of Patent: Sep. 19, 2023

(54) MULTI-ANTENNA TIRE-PRESSURE MONITORING SYSTEM WITH AUTOMATICALLY POSITIONING FUNCTION

(71) Applicant: Chih-Wei Yu, Taipei (TW)

(72) Inventor: Chih-Wei Yu, Taipei (TW)

(73) Assignee: SYSGRATION LTD., Taipei (TW)

( * ) Notice: Subject to any disclaimer, the term of this patent is extended or adjusted under 35 U.S.C. 154(b) by 133 days.

(21) Appl. No.: 17/581,985

(22) Filed: Jan. 24, 2022

(65) Prior Publication Data

US 2022/0234398 A1 Jul. 28, 2022

(30) Foreign Application Priority Data

Jan. 28, 2021 (TW) .................. 110103219

(51) Int. Cl.
*B60C 23/04* (2006.01)
*H01Q 1/32* (2006.01)
(52) U.S. Cl.
CPC ....... *B60C 23/0444* (2013.01); *H01Q 1/3291* (2013.01)
(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/20; B60C 23/0411; B60C 23/0462; B60C 23/0444; B60C 23/0479; B60C 23/064; B60C 11/24; B60C 23/0488; B60C 23/007; B60C 23/062; B60C 23/0401; B60C 23/0413; B60C 11/246; B60C 23/06; B60C 23/043; B60C 23/0452; B60C 23/0467; B60C 23/0498; B60C 23/02; B60C 99/006; B60C 23/0428; B60C 23/0442; B60C 2019/004; B60C 23/009; B60C 23/0425; B60C 11/243;

(Continued)

(56) References Cited

U.S. PATENT DOCUMENTS

2022/0234398 A1* 7/2022 Yu ....................... B60C 23/0416

FOREIGN PATENT DOCUMENTS

CN 105774425 A * 7/2016
DE 112011102977 T5 * 8/2013 ......... B60C 23/0416

(Continued)

*Primary Examiner* — Andre J Allen

(57) ABSTRACT

A multi-antenna tire-pressure monitoring system with automatically positioning function includes tire-pressure sensors, a receiver and a central processing unit. The tire-pressure sensors are installed on tires of a vehicle, respectively, and each tire is installed with at least one tire-pressure sensor. Each tire-pressure sensor has a signal transmitting unit, the receiver includes two antennas and a built-in receiver control unit. A first phase angle and a second phase angle are formed between the signals transmitted from each tire-pressure sensor and the two antennas, the receiver control unit receives the first phase angle and the second phase angle, and the arithmetic unit calculates phase-difference parameter values, to determine the positions of the tires, the signal receiving unit built in the central processing unit receives and displays the information calculated by the arithmetic unit of the receiver, so as to complete positioning for the tires.

7 Claims, 9 Drawing Sheets

(58) Field of Classification Search
CPC ............ B60C 23/00354; B60C 23/004; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/0454; B60C 23/00; B60C 23/044; B60C 23/008; B60C 23/0455; B60C 23/0483; B60C 23/0461; B60C 23/0489; B60C 23/0474; B60C 23/0415; B60C 23/0491; B60C 25/002; B60C 23/00363; B60C 23/0481; B60C 23/0459; B60C 23/0471; B60C 11/0318; B60C 23/002; B60C 2019/005; B60C 2200/02; B60C 23/042; B60C 23/0476; B60C 23/0477; B60C 23/0405; B60C 23/0422; B60C 23/0423; B60C 23/0466; B60C 13/001; B60C 29/06; B60C 23/0437; B60C 23/0447; B60C 25/132; B60C 23/0449; B60C 23/0427; B60C 25/00; B60C 9/18; B60C 23/0484; B60C 23/0486; B60C 23/065; B60C 13/00; B60C 19/003; B60C 23/00336; B60C 23/08; B60C 17/00; B60C 2019/006; B60C 23/001; B60C 23/00345; B60C 25/142; B60C 17/02; B60C 23/0445; B60C 29/00; B60C 5/004; B60C 11/0083; B60C 25/145; B60C 9/02; B60C 11/0332; B60C 23/0457; B60C 25/18; B60C 11/13; B60C 23/0418; B60C 23/0469; B60C 23/12; B60C 29/066; B60C 99/00; B60C 23/0432; B60C 23/068; B60C 25/005; B60C 25/138; B60C 11/03; B60C 23/005; B60C 25/007; B60C 3/00; B60C 5/14; B60C 11/11; B60C 17/04; B60C 17/06; B60C 23/0435; B60C 23/063; B60C 23/10; B60C 25/0554; B60C 25/14; B60C 29/062; B60C 99/003; B60C 11/032; B60C 11/12; B60C 13/003; B60C 15/06; B60C 19/001; B60C 23/126; B60C 23/127; B60C 23/16; B60C 29/005; B60C 29/068; B60C 3/04; B60C 9/20; B60C 11/01; B60C 11/0302; B60C 13/02; B60C 25/056; B60C 29/04; B60C 5/142; B60C 11/0304; B60C 11/0306; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 1/0016; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/20022; B60C 2009/2025; B60C 2011/0358; B60C 2011/1254; B60C 2017/068; B60C 2200/04; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 23/085; B60C 25/0548; B60C 25/185; B60C 7/105; B60C 7/107; B60C 7/12; B60C 9/22; G01M 17/02; G01M 17/022; G01M 17/027; G01M 17/021; G01M 17/024; G01M 17/025; H01Q 1/2241; H01Q 1/3291
USPC .................................................. 73/146–146.8
See application file for complete search history.

(56) References Cited

FOREIGN PATENT DOCUMENTS

| | | | | |
|---|---|---|---|---|
| DE | 102022101562 A1 | * | 7/2022 | ......... B60C 23/0444 |
| JP | 4650328 B2 | * | 3/2011 | |
| JP | 2014016244 A | * | 1/2014 | |
| JP | 2014019360 A | * | 2/2014 | |
| WO | WO-2009015265 A1 | * | 1/2009 | ......... B60C 23/0416 |

* cited by examiner

MULTI-ANTENNA TIRE-PRESSURE MONITORING SYSTEM WITH AUTOMATICALLY POSITIONING FUNCTION

BACKGROUND OF THE INVENTION

1. Field of the Invention

The present invention is related to a multi-antenna tire-pressure monitoring system with automatically positioning function and applied to a technology field of vehicle. The present invention mainly applies a difference in the phase angles between the tire-pressure sensor installed on the tire and the antennas to calculate relative angles, so as to accurately determine horizontal positions and longitude positions of the tires, and determine whether the positions of the tires are accurate.

2. Description of the Related Art

In recent years, traffic safety is taken seriously, so walking pedestrians or drivers must follow many traffic rules, and, new delivered vehicles and small trucks must be equipped with tire pressure monitoring systems (TPMS), in order to improve safety of pedestrian and ensure the stability of the vehicle at high speed.

In the process of production and assembly, the vehicle factory installs tire-pressure sensors on tires, and the tire-pressure sensor is able to sense information of the tire such as pressure, temperature or battery power and provide the information to the driver when the vehicle is driving on the road in the future. Therefore, in order to install the tire-pressure sensors, the tire-pressure sensors must be adjusted and set to correspond the positions of the tires through multiple processes, so that the installed tire-pressure sensors are able to sense the tires when the vehicle is driving in the future. Generally, there are two existing methods for setting the tire-pressure sensors, the first existing method is manual input, a user holds a host to read the tires one by one and inputs data through on-board diagnostics (OBD II) interface in sequence, and the user must manually determine the inputted positions of the tires relative to the vehicle carefully. Obviously, the manual input method is very inconvenient.

The second existing method is an automatically-positioning method. The tire-pressure sensors can be classified into inside-type sensors and outside-type sensors, the inside-type sensor has a fixed installation direction, so the receiver receives data of X-axis and Z-axis accelerators on the inside-type sensor and calculates the position of the tire with algorithm. The automatically-positioning method can be implemented by a wireless auto location (WAL) method or a phase auto location (PAL) method. The WAL method uses X-axis rotation direction to determine the horizontal positions of tires and uses the signal strength to determine the longitudinal positions of the tires, so as to position the tires. In the PAL method, a rotation angle of the tire is obtained by ABS and then compared with RF transmission time to obtain a phase angle difference of the rotating rim, thereby calculating the position of the tire. When installing the tire-pressure sensor by the WAL or PAL method, the X-axis of the tire-pressure sensor must be parallel to a driving direction and the Z-axis of the tire-pressure sensor must be perpendicular to the driving direction for accurate calculation of the acceleration. However, for outside-type tire-pressure sensors, the angles of valves are different and the rotation angles after assembly are not constant, so the data of the X-axis and Z-axis sensor of the outside-type tire-pressure sensor cannot be used in the PAL method for positioning the tires.

Therefore, if the tire-pressure sensor fails to accurately position the tires after the above-mentioned vehicle assembly process, the tire-pressure monitoring system may continuously detect the tire with error while the vehicle is driving, and it causes the vehicle to have a very high risk in driving.

SUMMARY OF THE INVENTION

An objective of the present invention is to apply tire-pressure sensors to position tires by a quicker and more accurate manner, so as to solve the above-mentioned conventional technology drawbacks and problems.

In order to achieve the objective, the present invention provides a multi-antenna tire-pressure monitoring system with automatically positioning function, and the multi-antenna tire-pressure monitoring system includes tire-pressure sensors, a receiver, and a central processing unit. The tire-pressure sensors are installed on tires of a vehicle, respectively, one of the tires is installed with at least one of the tire-pressure sensors, and each of the tire-pressure sensors includes a signal transmitting unit built therein. The receiver includes two antennas, and a receiver control unit built therein, wherein the two antennas are spaced by an interval and configured to receive signals transmitted from the tire-pressure sensors, a first phase angle and a second phase angle are formed between the signal transmitted from each of the tire-pressure sensors and the two antennas, respectively, wherein the receiver control unit receives the first phase angle and the second phase angle, and the arithmetic unit calculates phase-difference parameter values based on the first phase angle and the second phase angle, the receiver control unit calculates relative angles between the tire-pressure sensors and the receiver based on the phase-difference parameter values, to determine horizontal and longitudinal positions of the tires. The central processing unit includes a signal receiving unit built therein, and the signal receiving unit is configured to receive and display information calculated by the arithmetic unit of the receiver. The two antennas receive the signal transmitted from each of the tire-pressure sensors to form the first phase angle and the second phase angle, the arithmetic unit calculates a phase difference between the first phase angle and the second phase angle to form the phase-difference parameter value, the receiver control unit accurately determines the horizontal and longitudinal positions of the tires based on the phase-difference parameter values.

According to aforementioned contents that the two antennas are configured to obtain the first phase angle and the second phase angle of each tire-pressure sensors installed on each tire and the arithmetic unit calculates the phase differences to obtain the different phase-difference parameter values, and then calculates the relative angles between the tire-pressure sensors and the receiver based on the phase-difference parameter values, so as to determine the positions of the tires based on the relative angles. Therefore, the present invention has advantages of quickly precisely positioning the tires and preventing the error caused by manual input manner.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
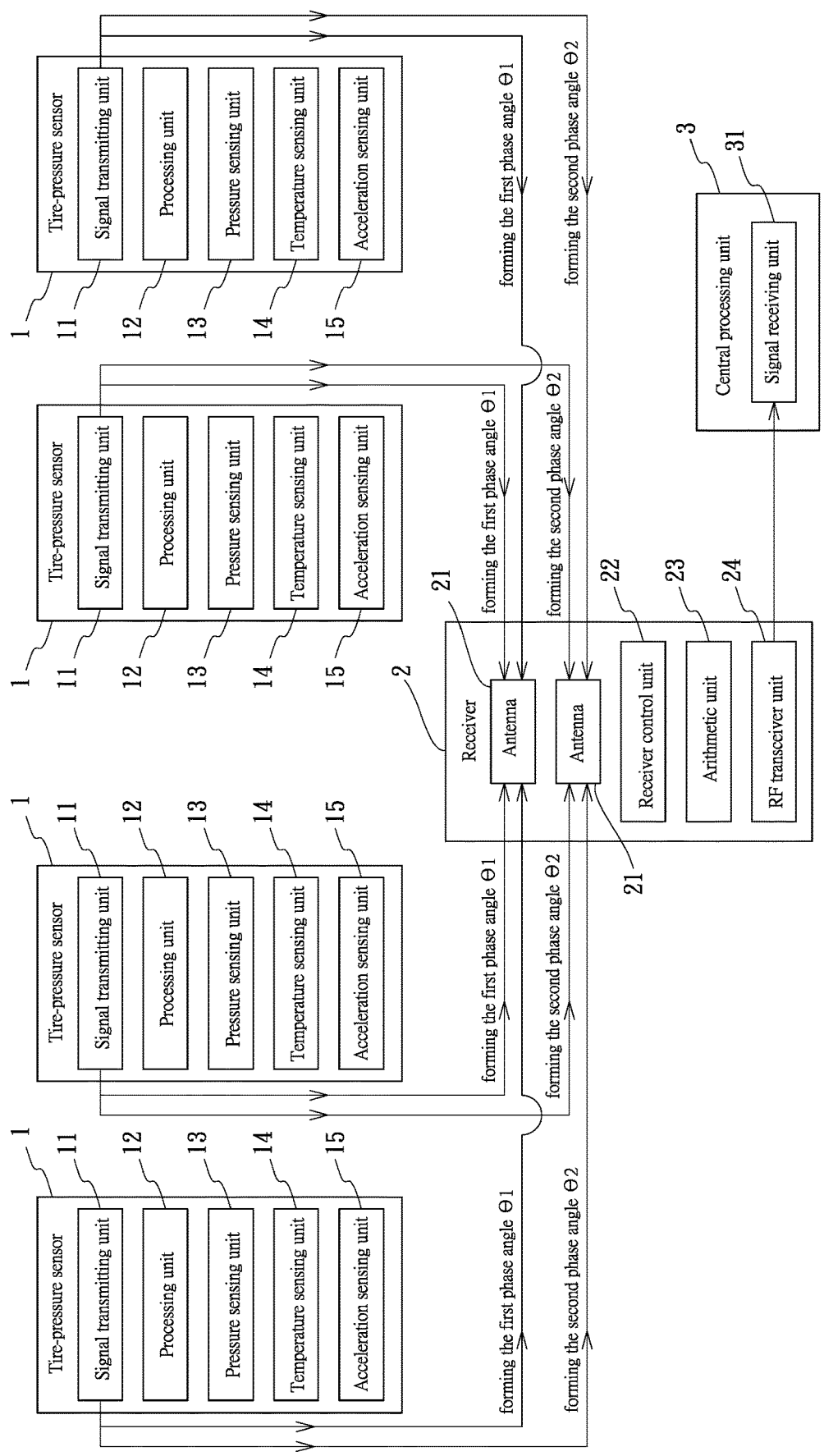
FIG. 1 is a block diagram of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms, as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening, elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

In order to clearly describe the objective of the present invention, the features and effects of the present invention are illustrated in detail with reference to embodiments. Please refer to FIGS. 1 to 9. As shown in FIG. 1, a multi-antenna tire-pressure monitoring system includes tire-pressure sensors 1 installed on tires 10 of a vehicle, respectively, and each tire 10 is installed with at least one tire-pressure sensor 1. Each of the tire-pressure sensors 1 includes a signal transmitting unit 11 built therein, a receiver 2, and a central processing unit 3. In figures of the present invention, the receiver 2 is installed on the rear end of a vehicle for illustration, but the installation position of the receiver 2 of the present invention is not limited to the example. The receiver 2 includes two antennas 21 and built-in receiver control unit 22, the two antennas 21 are disposed at the same horizontal levels and with the same heights, and spaced apart from each other by a certain interval. The two antennas 21 receive signals transmitted from the signal transmitting units 11 of the tire-pressure sensors 1. A first phase angle $\Theta1$ and a second phase angle $\Theta2$ are formed between the signal transmitted from each of the tire-pressure sensors 1 and the two antennas 21, respectively, and the receiver control unit 22 receives the first phase angle $\Theta1$ and the second phase angle $\Theta2$. The arithmetic unit 23 performs calculation to obtain phase-differences parameter values, the receiver control unit 22 determines the horizontal and longitude positions of the tires 10 based on the phase-difference parameter values. The central processing unit 3 includes a signal receiving unit 31 built therein and configured to receive and display the information calculated by the arithmetic unit 23 of the receiver 2. The two antennas 21 receive the signals transmitted from the tire-pressure sensor 1, to form the first phase angle $\Theta1$ and the second phase angle $\Theta2$, and the arithmetic unit 23 calculates the phase difference between the first phase angle $\Theta1$ and the second phase angle $\Theta2$, so as to obtain the phase-difference parameter values. The receiver control unit 22 can accurately determine the horizontal and longitude positions of the tires 10.

Figure 2:
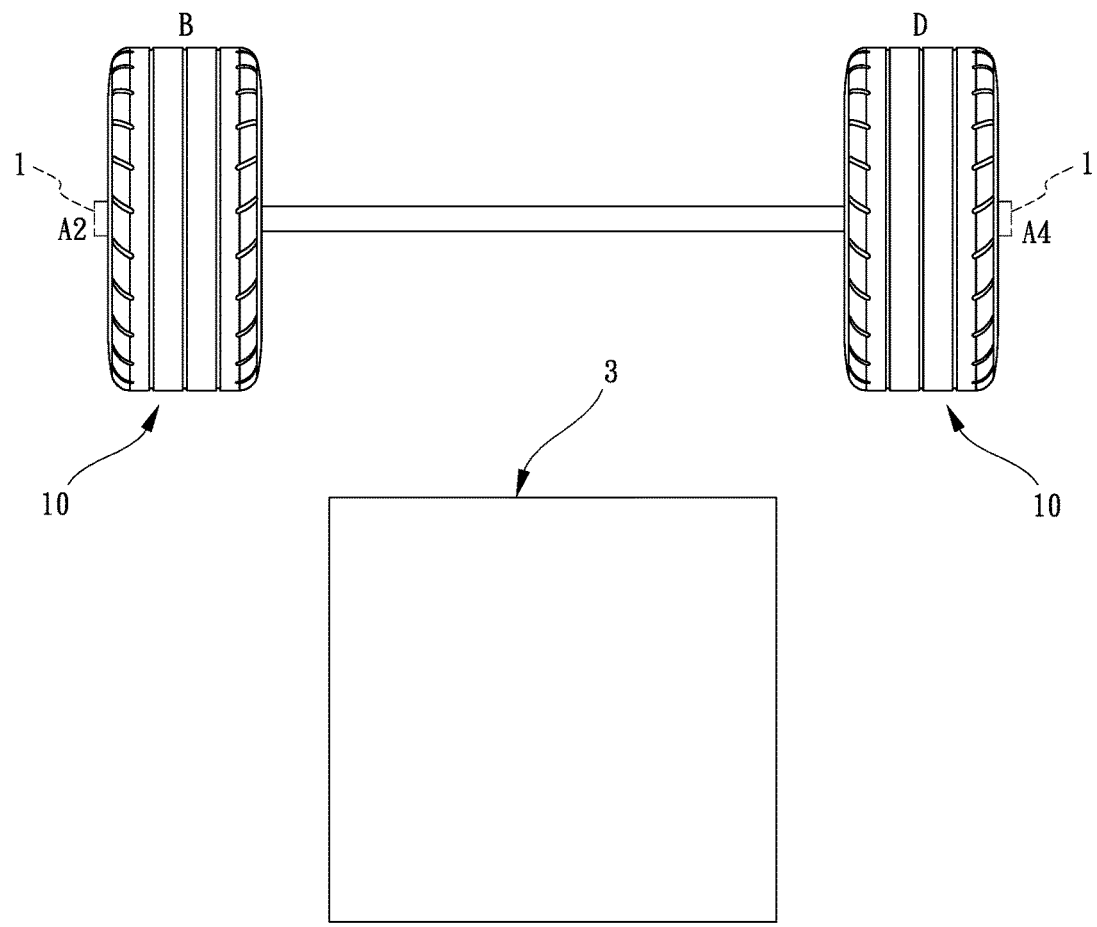
FIG. 2 is a schematic view showing a positional relationship between antennas and a tire-pressure sensor installed on a bottom left tire and located at an initial position, according to the present invention.
Figure 2:
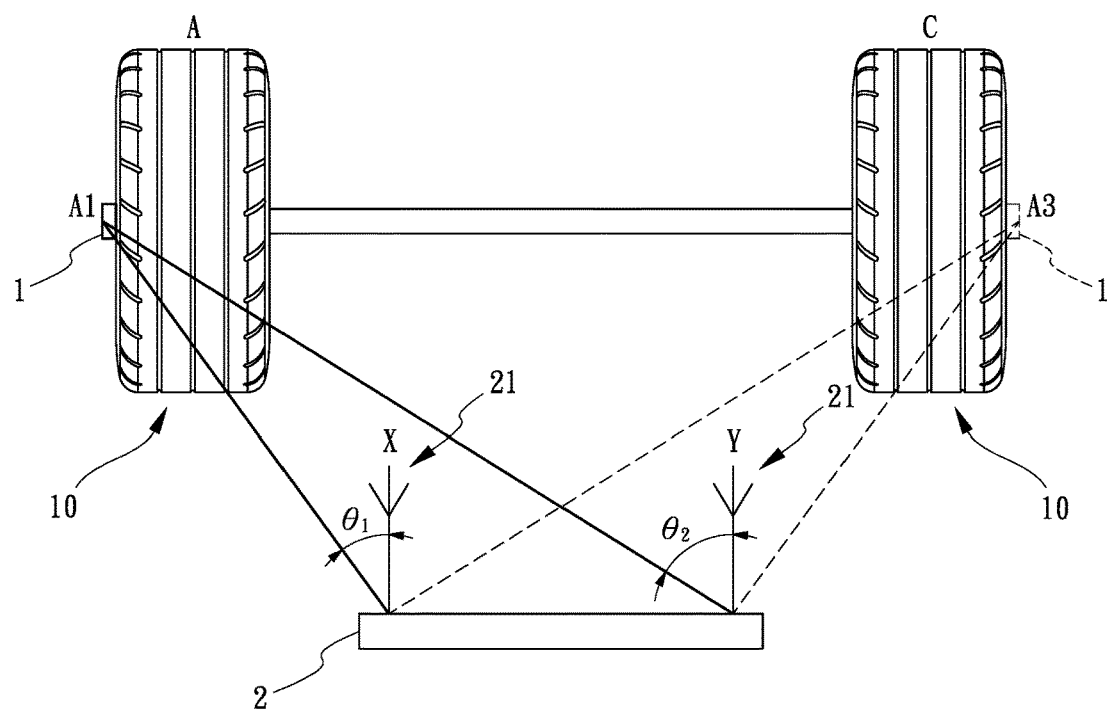
Figure 3:
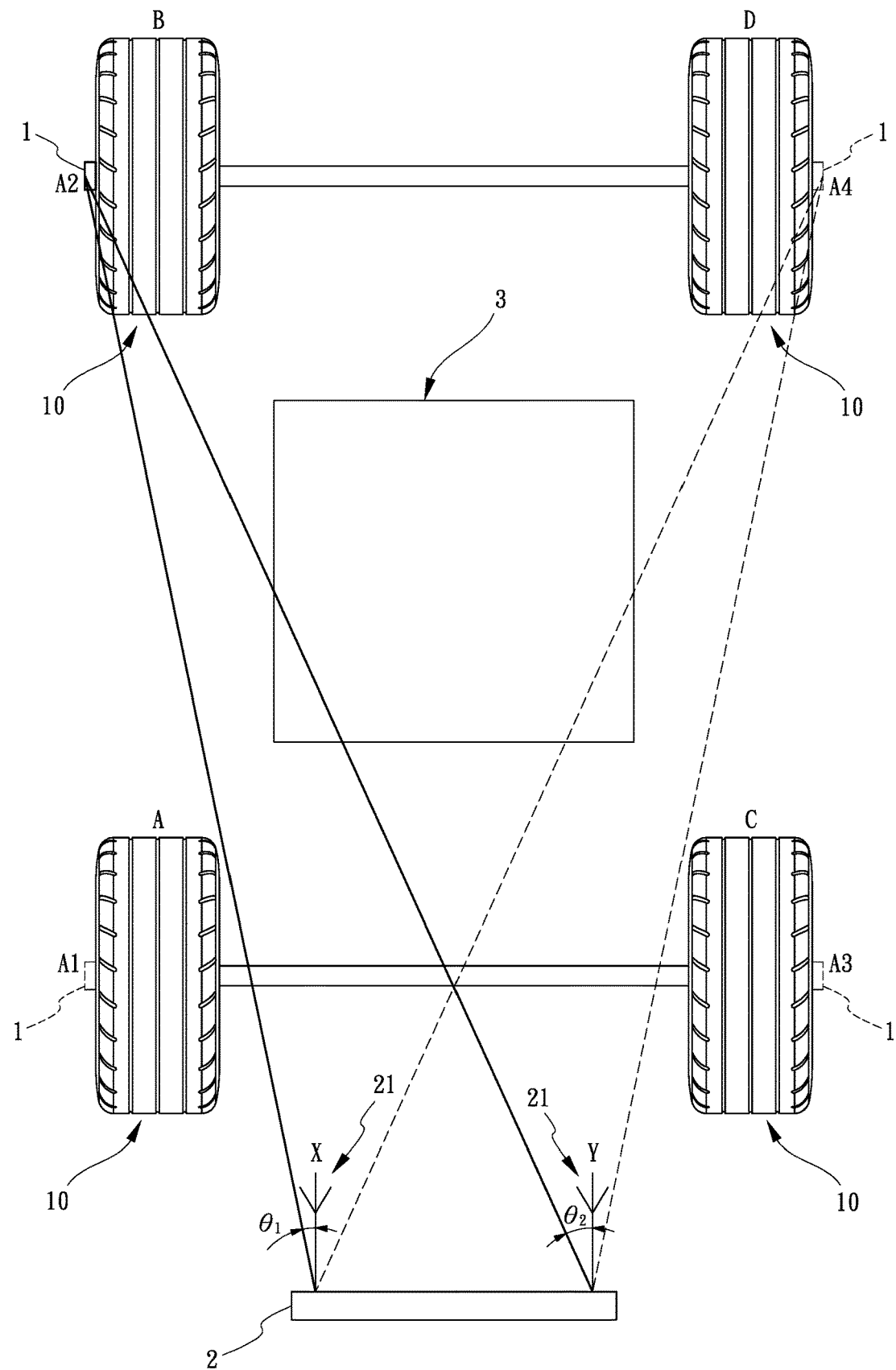
FIG. 3 is a schematic view showing a positional relationship between antennas and a tire-pressure sensor installed on a top left tire and located at an initial position, according to the present invention.
Figure 4:
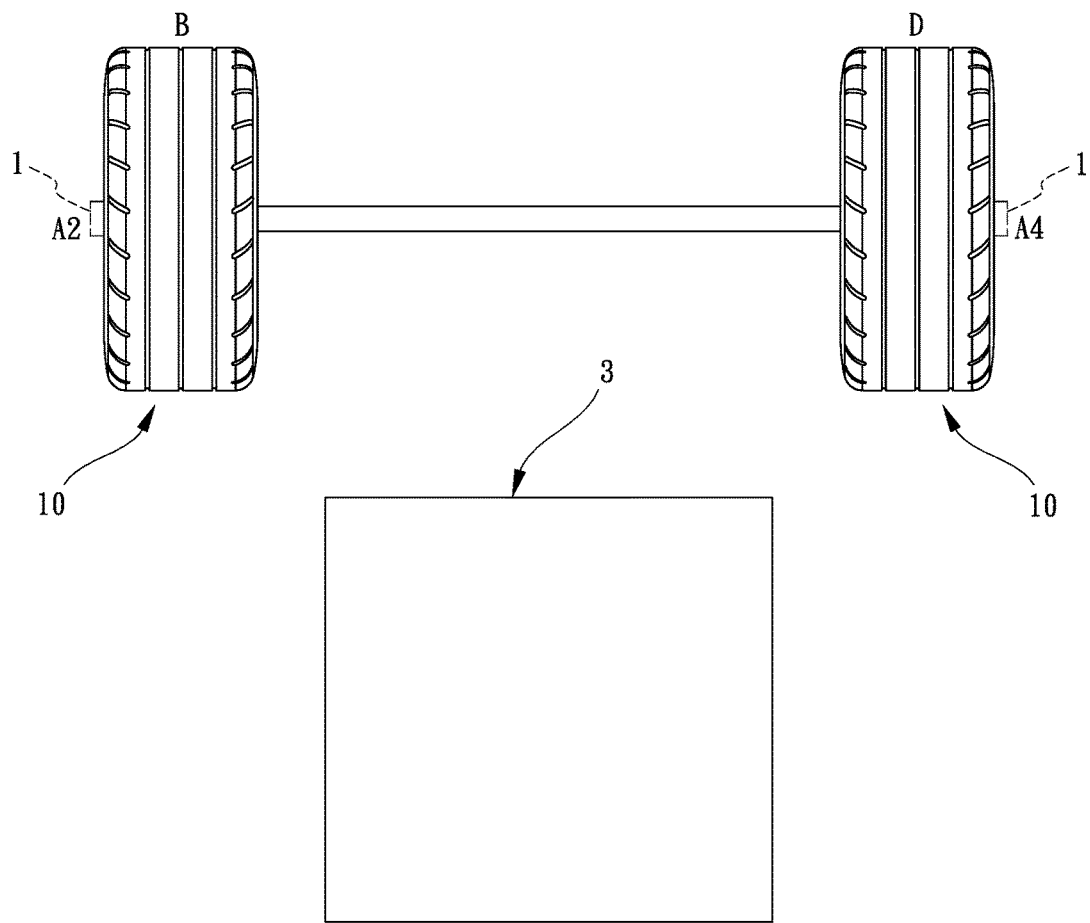
FIG. 4 is a schematic view showing a positional relationship between antennas and a tire-pressure sensor installed on a bottom right tire and located at an initial position, according to the present invention.
Figure 4:
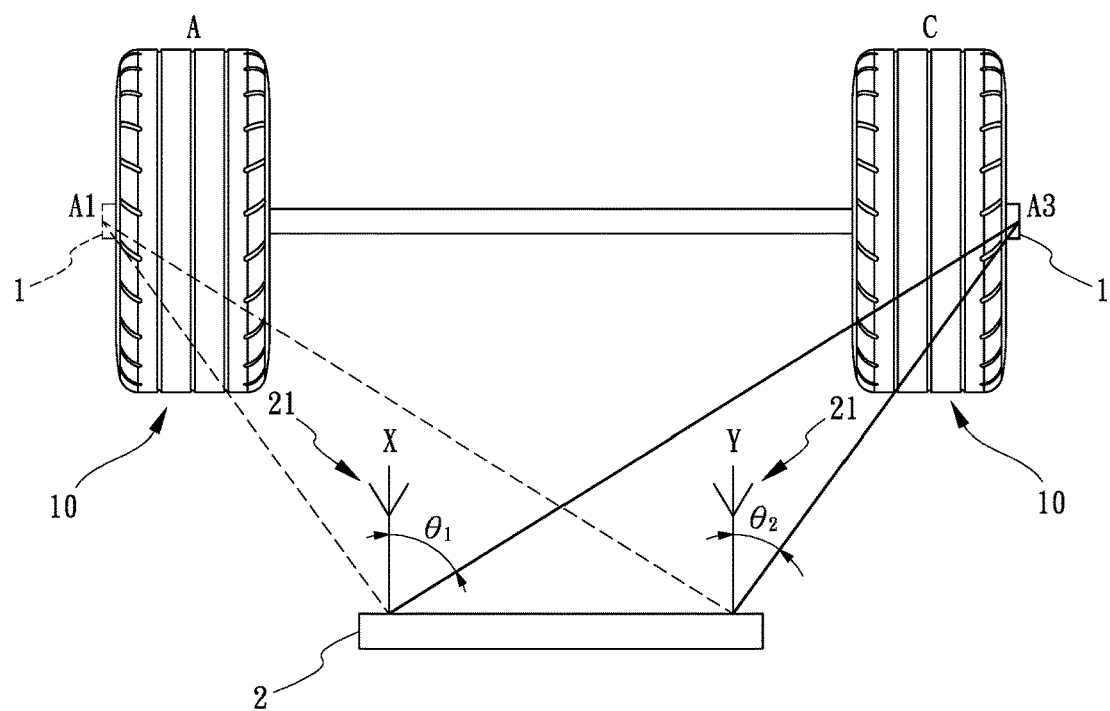
Figure 5:
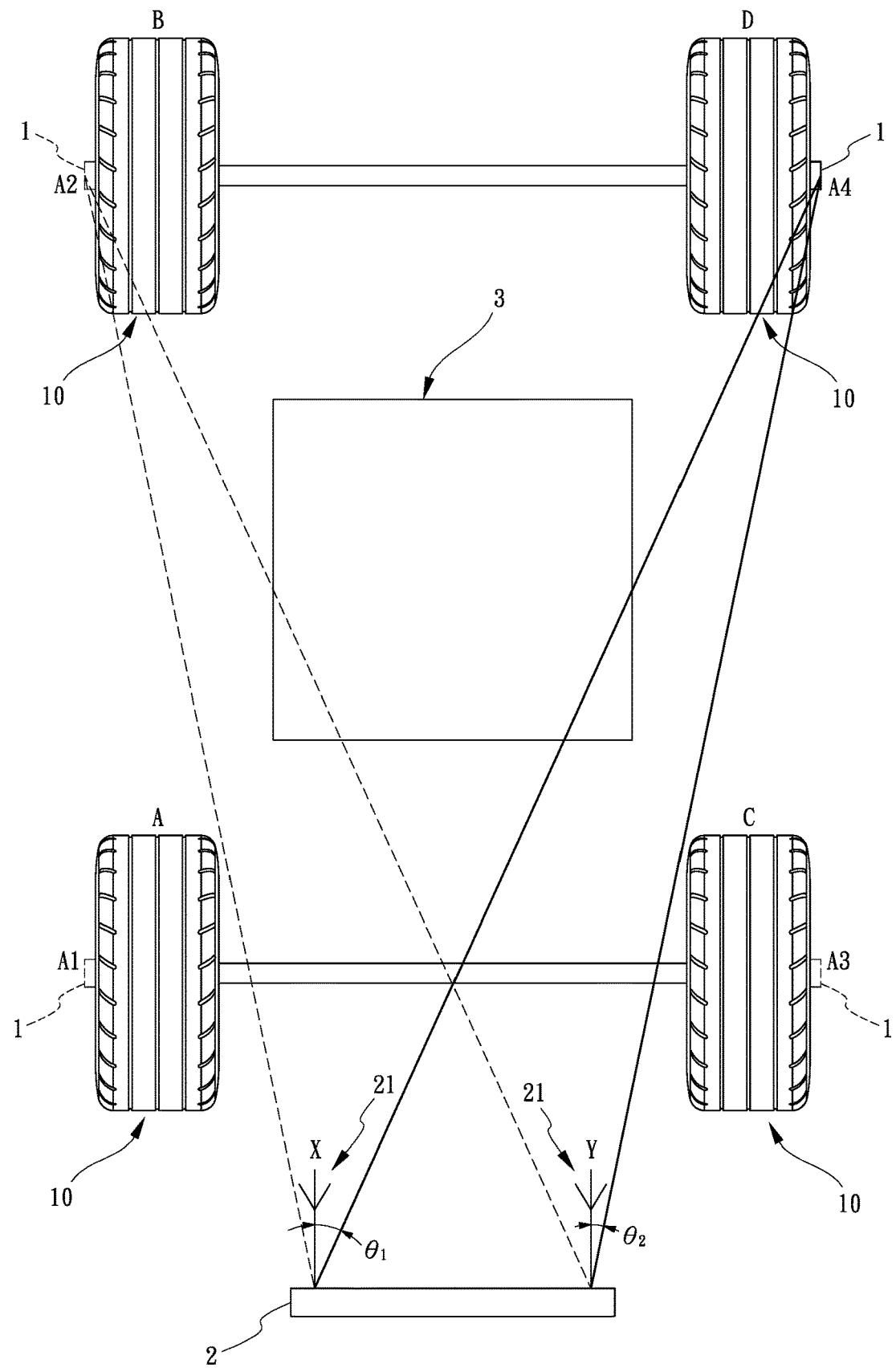
FIG. 5 is a schematic view showing a positional relationship between antennas and a tire-pressure sensor installed on a top right tire and located at an initial position, according to the present invention.

Please refer to FIGS. 1 to 9. The embodiment of single tire 10 will be illustrated in the following paragraphs according to aforementioned contents, FIGS. 2 to 5 shows four tires 10 which are respectively labelled as "A" (bottom left), "B" (top left), "C" (bottom right), and "D" (top right) for convenience in explanation. Each of the tires 10 is installed with one of the tire-pressure sensors 1, and the tire-pressure sensors 1 are labelled as "A1", "B1", "C1", "D1" corresponding to the labels of the tires, respectively. The positioning operation of the present invention is illustrated under the condition that the tires 10 are not deflected, as shown in. FIG. 2, when the tire 10 (labelled as "A1") is not rotated, the position of the tire-pressure sensor 1 (labelled as "A1") is defined as an initial position 4, the tire-pressure sensor 1 (labelled as "A1") transmits signal to the receiver 2 through the signal transmitting unit 11, the two antennas 21 (labelled as X and Y, respectively) disposed in the receiver 2 receive the signal. With the configuration of the antenna 21 (labelled as X) and the antenna 21 (labelled as Y) spaced apart from each other by the interval, the receiver 2 obtains the first phase angle Θ1 between the tire-pressure sensor 1 (labelled as A1) and the antenna 21 (labelled as X), and the second phase angle Θ2 between the tire-pressure sensor 1 (labelled as A1) and the antenna 21 (labelled as Y), and the first phase angle Θ1 is smaller than the second phase angle Θ2. After the receiver control unit 22 obtains the values of the first phase angle Θ1 and the second phase angle Θ2, the arithmetic unit 23 built in the receiver 2 can calculate the phase-difference parameter values, and the obtained phase-difference parameter values are dedicated data of the tire 10 (labelled as A), and the arithmetic unit 23 transmits the calculated phase-difference parameter values to the central processing unit 3. The central processing unit 3 processes and converts the signal received by the signal receiving unit 31, to accurately position the tire 10 (labelled as "A"), so that the driver can obtain the current situation of the tire 10 (labelled as "A"); as shown in FIG. 2, the tires (labelled as "A" and "C") are determined as left and right tires based on signal transmission; the signal transmission is also occurred at another tires 10, the dotted line indicates the signal transmission, and FIGS. 3 and 5 shows the signal transmission in the way.

Figure 6:
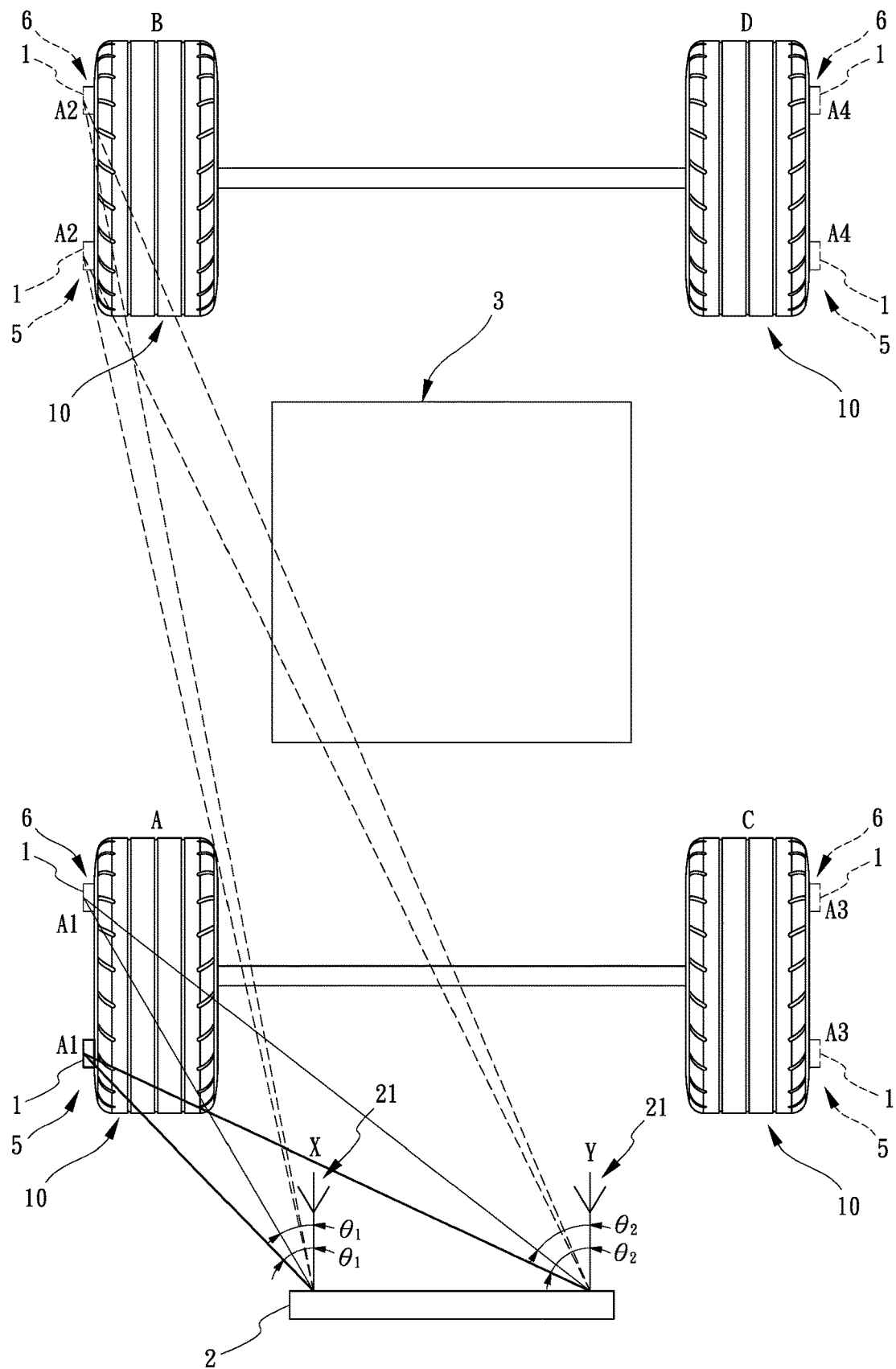
FIG. 6 is a schematic view showing a positional relationship between antennas and a tire-pressure sensor installed on a bottom left tire and located at an extremely-close position and an extremely-far position while the tire is rotating, according to the present invention.
Figure 7:
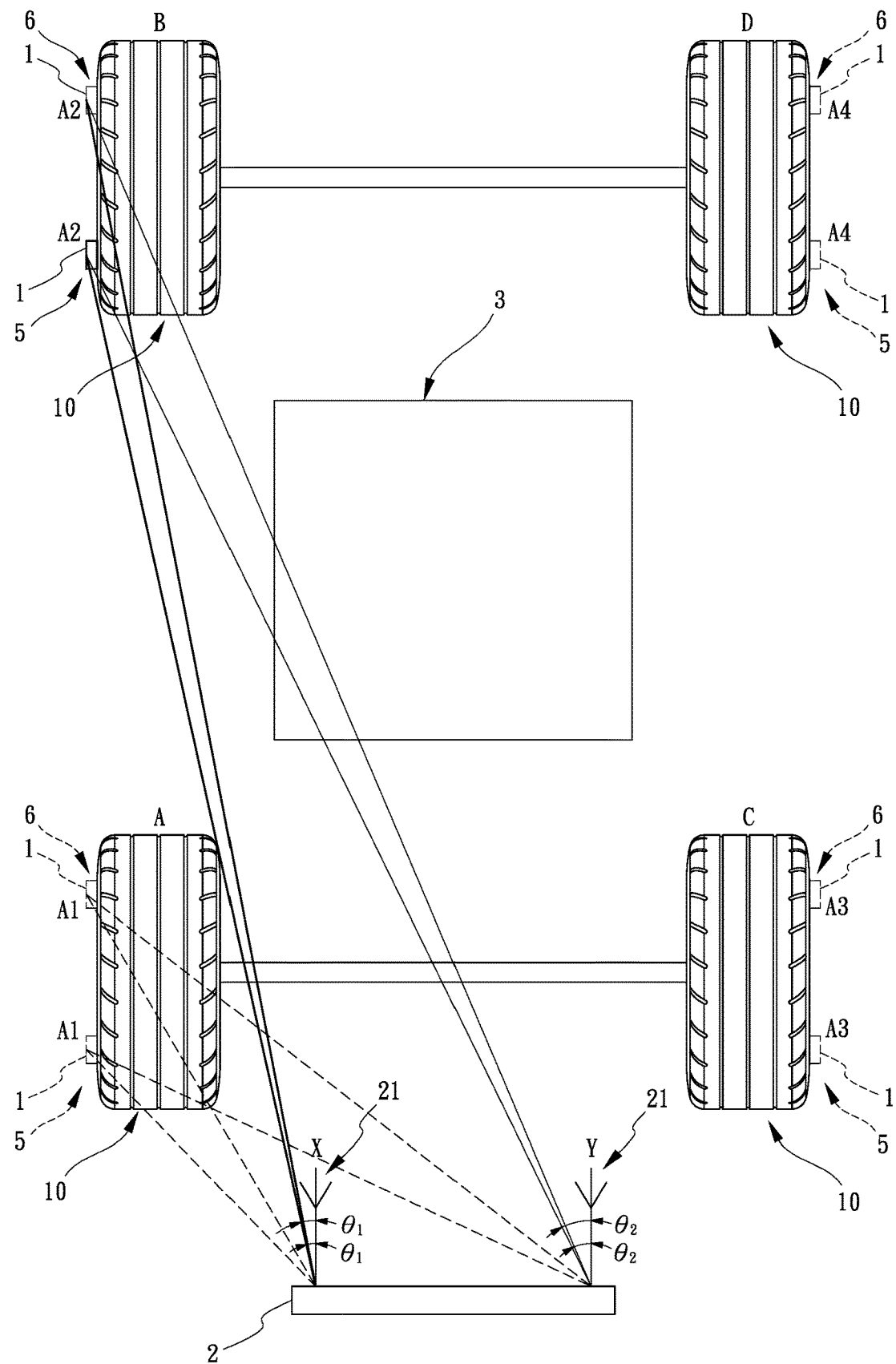
FIG. 7 is a schematic view showing a positional relationship between antennas and a tire-pressure sensor installed on a top left tire at an extremely-close position and an extremely-far position while the tire is rotating, according to the present invention.
Figure 8:
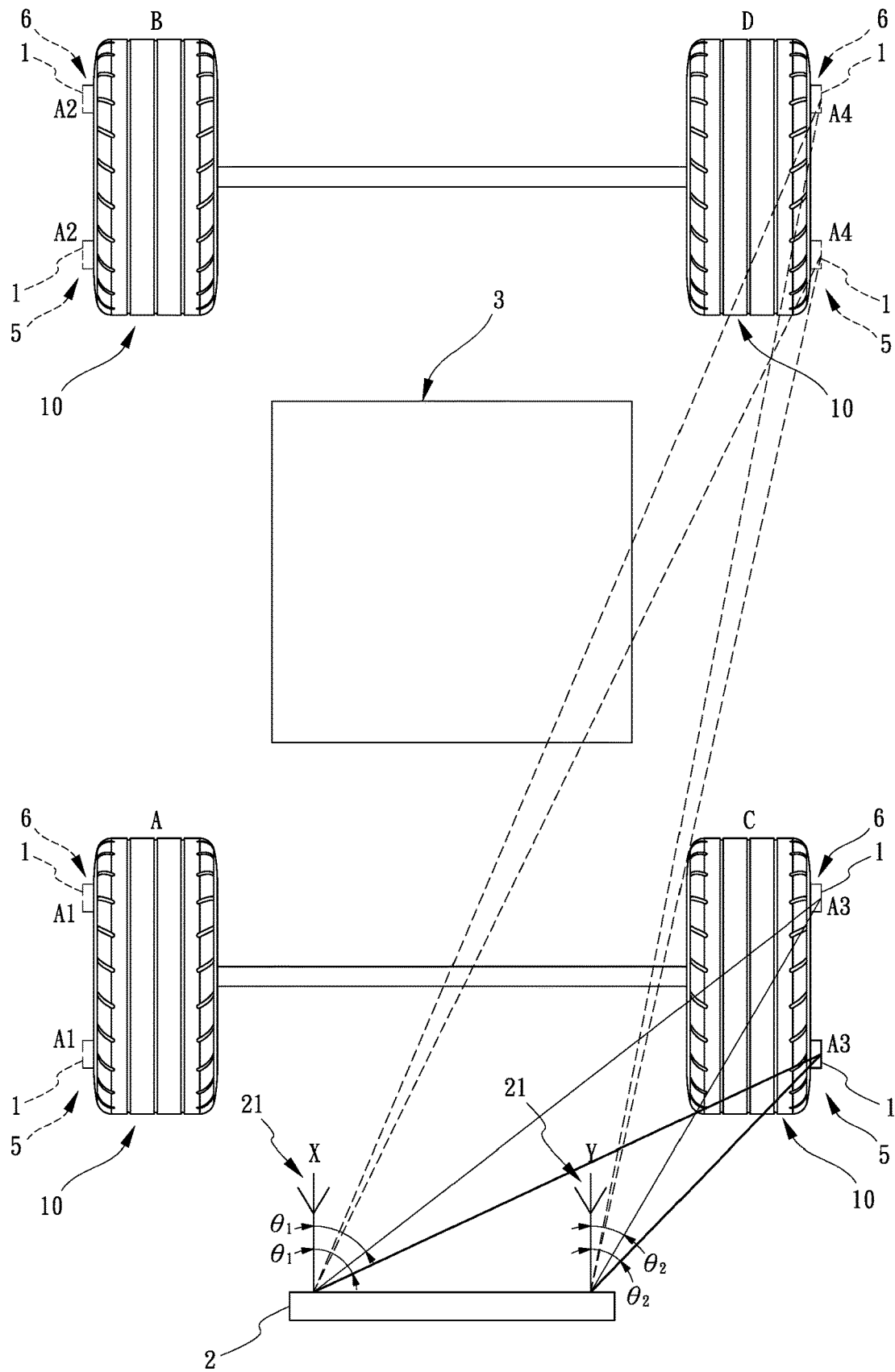
FIG. 8 is a schematic view showing a positional relationship between antennas and a tire-pressure sensor installed on a bottom right tire at an extremely-close position and an extremely-far position while the tire is rotating, according to the present invention.
Figure 9:
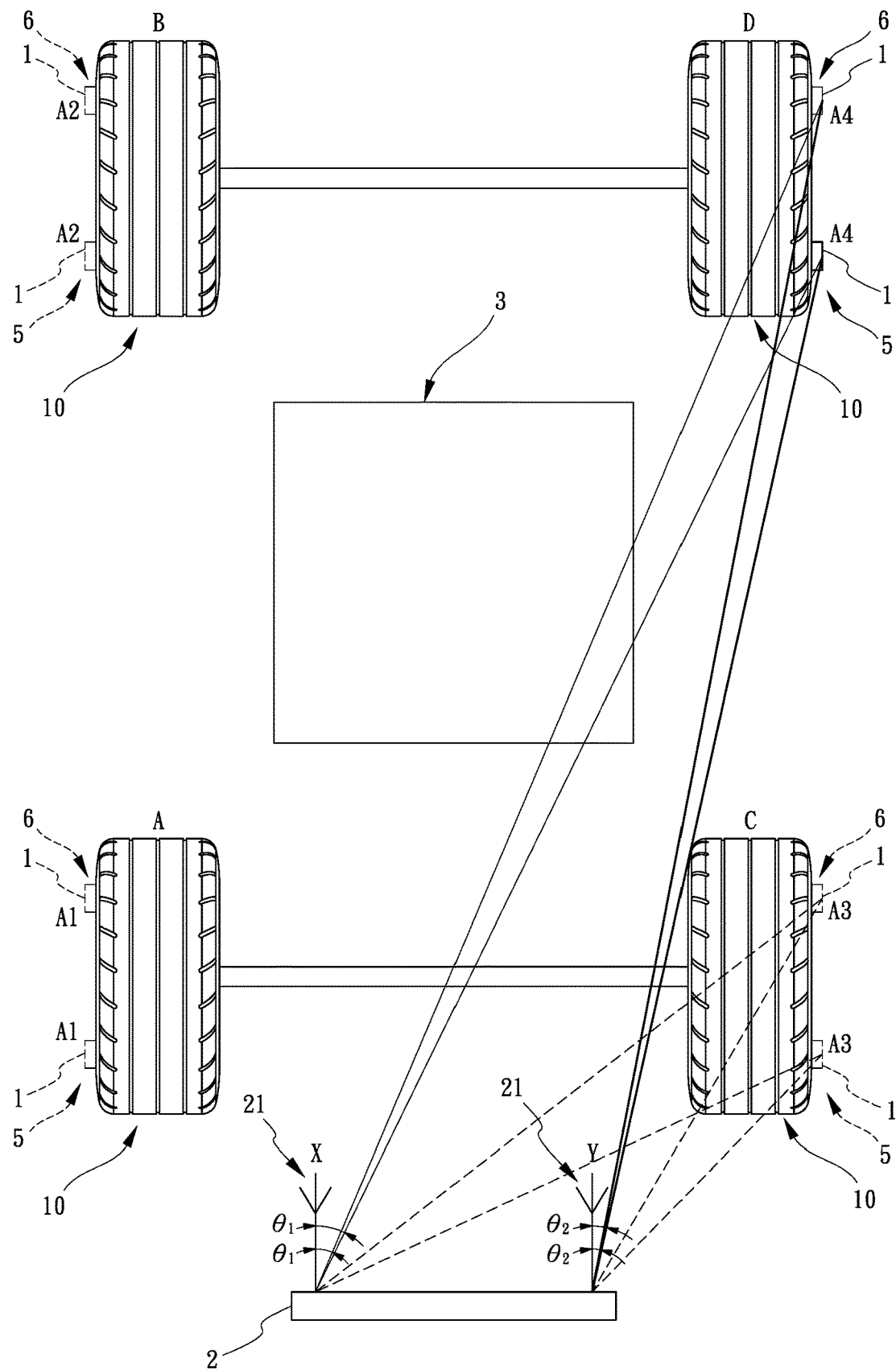
FIG. 9 is a schematic view showing a positional relationship between antennas and a tire-pressure sensor installed on a top right tire and located at an extremely-close position and an extremely-far position while the tire is rotating, according to the present invention.

The manner of positioning another tires 10, which are respectively labelled as "B", "C" and "D", is the same as above-mentioned manner. The above-mentioned positioning manner is mainly to determine the horizontals positions of the tires 10 relative to the vehicle, but unable to accurately determine the longitudinal positions of the tires 10. In the present invention, the longitudinal positions of the tires 10 are accurately determined while the tires 10 are rotating. As shown in FIG. 6, while the tire 10 (labelled as "A") is rotating, an extremely-close position 5 and an extremely-far position 6 of the tire-pressure sensor 1 (labelled as "A1") relative to the receiver 2 can be defined, respectively; when the tire-pressure sensor 1 (labelled as "A1") is at the extremely-close position 5, the tire-pressure sensor 1 (labelled as "A1") transmits signal and the antenna 21 (labelled as "X") and the antenna 21 (labelled as "Y") of the receiver 2 receive the signal; when the tire-pressure sensor 1 (labelled as "A1") is at the extremely-far position 6, the tire-pressure sensor 1 (labelled as "A1") transmits signal, and the antenna 21 (labelled as "X") and the antenna 21 (labelled as "Y") of the receiver 2 receive the signal. After the tire 10 (labelled as "A") rotates and the receiver 2 receives and cumulate signals for a period, the arithmetic unit 23 can calculate the signals to obtain another phase-difference parameter values of the tire 10 (labelled as "A"), so as to position the longitudinal position of the tire 10. As shown in FIG. 7, the first phase angles Θ1 and the second phase angles Θ2 shown in FIG. 6 and FIG. 7 are not the same, so that the longitudinal positions of the left tires 10 of the vehicle can be clearly determined; after the longitudinal position of the tire 10 (labelled as "A") is determined and in corporation with the phase-difference parameter value generated by the manner of determining the horizontal position of the tire 10 (labelled as "A"), the tire 10 (labelled as "A") can be accurately determined to locate at the bottom left position of the vehicle. As shown in FIG. 6, the tires 10 (labelled as "A" and "B") are determined to be a front tire and a rear tire based on signal transmission; at the tire 10 (labelled as "A"), the signal transmission from the extremely-close position 5 is drawn by thick solid line, and the signal transmission from the extremely-far position 6 is drawn by thin solid line, signal transmission is also occurred at another tire 10, and the dotted line indicates the signal transmission, and FIGS. 6 to 9 show the signal transmission in the same way.

According to aforementioned illustration, the manner of positioning the remaining tires 10 (labelled as "B", "C" and "D") is the same as above-mentioned manner, the tire-pressure sensor 1 can transmit signal to the two antennas 21 at the initial position 4, the extremely-close position 5 and the extremely-far position 6, and the arithmetic unit 23 can calculate different phase-difference parameter values based on the received signal, so that the position of the tire 10 can be accurately and quickly determined. The phase difference calculation is performed by the arithmetic unit based on the formula: $\theta = \arccos((\phi\lambda)/(2\pi d))$, $\theta$ is a relative angle between the tire-pressure sensor 1 and the receiver 2, $\psi$ is a phase difference, $\lambda$ is wavelength of signal transmitted from the tire-pressure sensor 1 to the antenna 21, and d is the distance between the two antennas 21; the calculation based on the above-mentioned formula can obtain accurate phase angle difference between the signals transmitted from the tire-pressure sensor 1 to the two antennas 21, so that the receiver control unit 22 can determine the positions of the tires 10 based on the phase-difference parameter values.

Another detailed features of the present invention will be illustrated in the following paragraphs. Please refer to FIG. 1. The receiver 2 of the present invention includes an RF transceiver unit 24 built therein and configured to transmit signal. The RF transceiver unit 24 receives the signals of the tire-pressure sensors 1 and transmits the phase-difference parameter values calculated by the arithmetic unit 23 to the central processing unit 3. In an embodiment, the central processing unit 3 of the present invention can be an electronic apparatus with a display screen, so that the central processing unit 3 can provide a driver or a user to check the result of positioning the tires 10, and condition information of the tire 10 before positioning. Besides displaying the positioning status of the tires 10, the central processing unit 3 of the present invention can display the detailed situations of the tires 10; for example, each tire-pressure sensor 1 can include a processing unit 12, a pressure sensing unit 13, a temperature sensing unit 14 and an acceleration sensing unit 15 built therein, the pressure sensing unit 13 senses a remaining pressure of the tire 10, the temperature sensing unit 14 senses a temperature inside the tire 10, the acceleration sensing unit 15 senses a rotation speed of the tire 10 while the tire 10 is rotating, and the processing unit 12 integrates the sensed pressure, temperature and the rotation speed, and transmits the integrated data to the receiver 2 through the signal transmitting unit 11. The receiver 2 collects and converts the data, and then transmits the converted data to the central processing unit 3, and the central processing unit 3 displays the received data to make the driver or the user obtain the relevant parameter values including pressure, temperature and acceleration, thereby ensuring driving safety, as shown in FIG. 1.

It is worth noting that the amount of the antennas 21 of the present invention can be more than two to more accurately position the tires, and the configuration of more antennas 21 can resist noise interference. In an embodiment, the antennas 21 can be arranged in a line, a matrix or a circle (not shown in figures). Therefore, the configuration of more antennas 21 can improve calculation accuracy to effectively position the tires 10.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A multi-antenna tire-pressure monitoring system with automatically positioning function, comprising:

tire-pressure sensors installed on tires of a vehicle, respectively, wherein one of the tires is installed with at least one of the tire-pressure sensors, and each of the tire-pressure sensors comprises a signal transmitting unit built therein;

a receiver comprising two antennas, and a receiver control unit built therein, wherein the two antennas are spaced by an interval and configured to receive signals transmitted from the tire-pressure sensors, a first phase angle and a second phase angle are formed between the signal transmitted from each of the tire-pressure sensors and the two antennas, respectively, wherein the receiver control unit receives the first phase angle and the second phase angle, and the arithmetic unit calculates phase-difference parameter values based on the first phase angle and the second phase angle, the receiver control unit calculates relative angles between the tire-pressure sensors and the receiver based on the phase-difference parameter values, to determine horizontal and longitudinal positions of the tires; and a central processing unit comprising a signal receiving unit built therein, wherein the signal receiving unit is configured to receive and display information calculated by the arithmetic unit of the receiver;

wherein the two antennas receive the signal transmitted from each of the tire-pressure sensors to form the first phase angle and the second phase angle, the arithmetic unit calculates a phase difference between the first phase angle and the second phase angle to form the phase-difference parameter value, the receiver control unit accurately determines the horizontal and longitudinal positions of the tires based on the phase-difference parameter values.

2. The multi-antenna tire-pressure monitoring system with automatically positioning function according to claim 1, wherein the receiver further comprises an RF transceiver unit built therein, the RF transceiver unit receives the signals of the tire-pressure sensors, and transmits the phase-difference parameter values calculated by the arithmetic unit to the central processing unit.

3. The multi-antenna tire-pressure monitoring system with automatically positioning function according, to claim 1, wherein each of the tire-pressure sensors comprises a processing unit, a pressure sensing unit, a temperature sensing unit and an acceleration sensing unit built therein, the pressure sensing unit senses a remaining pressure of the tire, the temperature sensing unit senses a temperature inside the tire, the acceleration sensing unit senses a rotation speed of the tire while the tire is rotating, and the processing unit integrates the remaining pressure, the temperature and the rotation speed, and transmits the integrated data to the receiver through the signal transmitting unit.

4. The multi-antenna tire-pressure monitoring system with automatically positioning function according to claim 2, wherein each of the tire-pressure sensors comprises a processing unit, a pressure sensing unit, a temperature sensing unit and an acceleration sensing unit built therein, the pressure sensing unit senses a remaining pressure of the tire, the temperature sensing unit senses a temperature inside the tire, the acceleration sensing unit senses a rotation speed of the tire while the tire is rotating, and the processing unit integrates the pressure, the temperature and the rotation speed, and transmits the integrated data to the receiver through the signal transmitting unit.

5. The multi-antenna tire-pressure monitoring system with automatically positioning function according to one of claim 1, wherein the arithmetic unit performs calculation on the first phase angle and the second phase angle based on a calculation formula: $\theta=\arccos((\phi\lambda)/(2\pi d))$, wherein $\theta$ is a relative angle between the tire-pressure sensor and the receiver, $\psi$ is an angle difference between the phase angles received by the two antennas, $\lambda$ is a wavelength of the wireless signal transmitted from the tire-pressure sensor to the antenna, and d is a distance between the two antennas.

6. The multi-antenna tire-pressure monitoring system with automatically positioning function according to claim 5, wherein the amount of the antennas is more than two, the configuration of multiple antennas improves accuracy in positioning for the tires, and the antennas are arranged in a line, a matrix or a circle.

7. The multi-antenna tire-pressure monitoring system with automatically positioning function according to claim 6, wherein when the tires are not rotated, the positions of the tire-pressure sensors are defined as initial positions, the signal transmitted from the tire-pressure sensors at the initial positions to the receiver are used to position horizontal positions of the tires, wherein while the tires are rotating, the positions of each of the tire-pressure sensors comprise an extremely-close position and an extremely-far position relative to the receiver, and the signals transmitted from the tire-pressure sensors at the extremely-close positions and the extremely-far positions to the receiver are used to determine the longitude positions of the tires, wherein the tire-pressure sensors continuously transmits signals to the receiver, the arithmetic unit built in the receiver continuously calculates to improve the accuracy in positioning for the tires.

\* \* \* \* \*